(12) United States Patent
Ito et al.

(10) Patent No.: US 12,077,946 B2
(45) Date of Patent: Sep. 3, 2024

(54) CONSTRUCTION MACHINE

(71) Applicant: KOBELCO CONSTRUCTION MACHINERY CO., LTD., Hiroshima (JP)

(72) Inventors: Masaru Ito, Hiroshima (JP); Hitoshi Sasaki, Hiroshima (JP); Seiji Saiki, Hiroshima (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 1029 days.

(21) Appl. No.: 16/968,420

(22) PCT Filed: Jan. 16, 2019

(86) PCT No.: PCT/JP2019/001128
§ 371 (c)(1),
(2) Date: Aug. 7, 2020

(87) PCT Pub. No.: WO2019/181159
PCT Pub. Date: Sep. 26, 2019

(65) Prior Publication Data
US 2020/0399861 A1    Dec. 24, 2020

(30) Foreign Application Priority Data

Mar. 23, 2018    (JP) .................................. 2018-055964

(51) Int. Cl.
*E02F 9/26*    (2006.01)
*B60K 35/00*    (2024.01)
(Continued)

(52) U.S. Cl.
CPC ................ *E02F 9/26* (2013.01); *B60K 35/00* (2013.01); *B60R 1/24* (2022.01); *E02F 9/16* (2013.01);
(Continued)

(58) Field of Classification Search
CPC ... E02F 9/26; E02F 9/16; E02F 9/2004; E02F 3/32; B60K 35/00; B60K 2370/1529;
(Continued)

(56) References Cited

U.S. PATENT DOCUMENTS

2013/0135198 A1*  5/2013  Hodge .............. H04N 21/4436
                                                    345/156
2014/0118533 A1    5/2014  Chang
(Continued)

FOREIGN PATENT DOCUMENTS

CN       103649426 A       3/2014
JP         8-158415 A       6/1996
(Continued)

OTHER PUBLICATIONS

English Translation of JP2010059653A (Year: 2010).*
(Continued)

*Primary Examiner* — Andrew J Cromer
(74) *Attorney, Agent, or Firm* — Oblon, McClelland, Maier & Neustadt, L.L.P.

(57) ABSTRACT

A construction machine capable of suppressing deterioration in work efficiency includes an angle detecting device that detects a relative angle between a lower travelling body and an upper slewing body, a travel lever that can be manipulated to make the lower travelling body travel, a display, a directional information generating unit that generates information related to a travelling direction of the lower travelling body based on a detected result of the angle detecting device, and a display controller. The display controller causes the display to display an arrow image indicating the travelling direction of the lower travelling body generated by the directional information generating unit when the
(Continued)

travel lever is manipulated and does not permit the display to display the arrow image when the travel lever is not manipulated.

4 Claims, 8 Drawing Sheets

(51) Int. Cl.
    *B60K 35/23*     (2024.01)
    *B60K 35/28*     (2024.01)
    *B60R 1/24*     (2022.01)
    *E02F 3/32*     (2006.01)
    *E02F 9/16*     (2006.01)
    *E02F 9/20*     (2006.01)

(52) U.S. Cl.
    CPC .......... *E02F 9/2004* (2013.01); *B60K 35/23* (2024.01); *B60K 35/28* (2024.01); *B60K 2360/162* (2024.01); *B60R 2300/205* (2013.01); *B60R 2300/302* (2013.01); *B60R 2300/70* (2013.01); *E02F 3/32* (2013.01)

(58) Field of Classification Search
    CPC ............. B60K 2370/162; B60R 1/00; B60R 2300/205; B60R 2300/302; B60R 2300/70
    See application file for complete search history.

(56) References Cited

U.S. PATENT DOCUMENTS

2017/0121938 A1*   5/2017   Yamada ............... E02F 9/2012
2018/0371724 A1   12/2018   Ohiwa et al.

FOREIGN PATENT DOCUMENTS

| JP | 2006-219894 A | | 8/2006 |
| --- | --- | --- | --- |
| JP | 2007-8284 A | | 1/2007 |
| JP | 2007-198040 A | | 8/2007 |
| JP | 2009-173195 A | | 8/2009 |
| JP | 2010-59653 A | | 3/2010 |
| JP | 2010059653 A | * | 3/2010 |
| JP | 2012-107395 A | | 6/2012 |
| JP | 547870 B2 | | 4/2014 |
| JP | 2017-22433 A | | 1/2017 |
| JP | 2017-115491 A | | 6/2017 |

OTHER PUBLICATIONS

International Search Report issued on Feb. 26, 2019 in PCT/JP2019/001128 filed on Jan. 16, 2019, 2 pages.
Combined Chinese Office Action and Search Report issued Sep. 10, 2021 in Chinese Patent Application No. 201980014879.6 (with English summary), 10 pages.
Extended European Search Report issued Feb. 18, 2021 in European Patent Application No. 19772496.6, 7 pages.

* cited by examiner

CONSTRUCTION MACHINE

TECHNICAL FIELD

The present invention relates to a construction machine including a lower travelling body and an upper slewing body that is provided on an upper portion of the lower travelling body and is slewable.

BACKGROUND ART

In a construction machine including a lower travelling body and an upper slewing body that is provided on an upper portion of the lower travelling body and is slewable, a traveling direction of the lower travelling body recognized by an operator in a cab provided to the upper slewing body differs for different slew angles of the upper slewing body relative to the lower travelling body. Therefore, the operator manipulating the lower travelling body to travel might get disoriented and cannot recognize which direction the lower travelling body is travelling.

Patent Literature 1 discloses a monitoring device provided to the construction machine and configured to estimate a relative angle of a lower travelling body to an upper slewing body from a chronological change in an image displayed on a monitor screen and display estimated angle information on the monitor screen. Since the correct angle information of the upper slewing body (direction indicated by an arrow) is displayed on the monitor screen even when the upper slewing body slews, the operator can make the lower travelling body travel based on the angle information.

In the technique described in Patent Literature 1, the angle information of the upper slewing body is always displayed on the monitor screen. During an operation other than travelling, the angle information displayed on the monitor screen might disturb the operator and deteriorate work efficiency.

CITATION LIST

Patent Literature

Patent Literature 1: JP 5473870 B2

SUMMARY OF INVENTION

An object of the present invention is to provide a construction machine in which an operator in a cab of an upper slewing body can recognize a travelling direction of a lower travelling body, and deterioration in work efficiency when the lower travelling body is not travelling can be suppressed.

The present invention provides a construction machine including a machine body including a lower travelling body that can travel on a ground, and an upper slewing body that is provided on an upper portion of the lower travelling body and can slew about a rotational axis extending in an up-and-down direction, an angle detecting device provided to the machine body to detect a relative angle between the lower travelling body and the upper slewing body about the rotational axis, a travel lever that receives a manipulation for making the lower travelling body travel, a display device disposed within an eyesight of the worker, a directional information generating unit that generates directional information related to a travelling direction of the lower travelling body relative to the upper slewing body based on at least a detected result of the angle detecting device, and a display controlling unit that controls the display device to display a directional information image indicating the directional information on the display device when the travel lever receives the manipulation, and not to display the directional information image on the display device when the travel lever does not receive the manipulation.

DESCRIPTION OF EMBODIMENTS

Preferable embodiments of the present invention will be described with reference to the drawings.

First Embodiment

[Configuration of Construction Machine]

Figure 1:
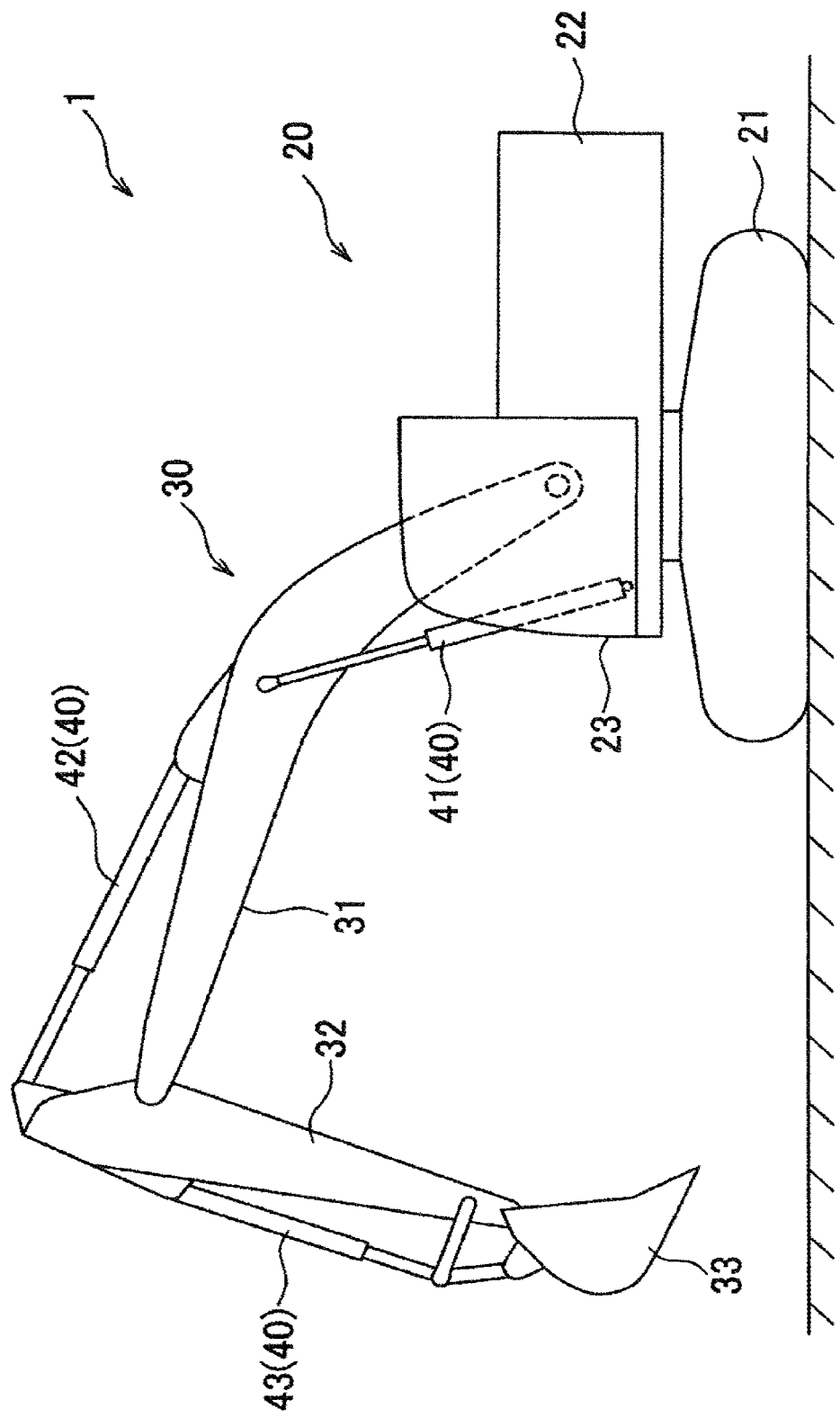
FIG. 1 is a side view of a construction machine according to a first embodiment of the present invention.

FIG. 1 is a side view of a construction machine 1 according to a first embodiment of the present invention. As illustrated in FIG. 1, the construction machine 1 is a machine that works using an attachment 30, for example, a hydraulic excavator. The construction machine 1 includes a machine body 20 including a lower travelling body 21, an upper slewing body 22, the attachment 30, and a cylinder 40.

The lower travelling body 21 is a part that makes the construction machine 1 travel. For example, the lower travelling body 21 includes a crawler and is capable of traveling on the ground. The upper stewing body 22 is attached to an upper portion of the lower travelling body 21 via a slewing device and is able to slew about a rotational axis extending in the up-and-down direction. A cab (operation room) 23 that has a window and allows an operator (worker) to get inside is provided to a front portion of the upper slewing body 22.

The attachment 30 is attached to the upper slewing body 22. The attachment 30 includes a boom 31, an arm 32, and a bucket 33. The boom 31 is attached to the upper slewing body 22 and is able to pivot about a horizontal pivot axis (can be raised and lowered). The arm 32 is attached to the boom 31 and is able to pivot about a horizontal pivot axis. The bucket 33 is attached to the arm 32 and is able to pivot about a horizontal pivot axis. The bucket 33 is used to perform works, such as excavation, flattening, and digging up of a work subject (earth, sand, etc.).

The cylinder 40 operates the attachment 30. The cylinder 40 is a hydraulic extend/contract cylinder. The cylinder 40 includes a boom cylinder 41, an arm cylinder 42, and a bucket cylinder 43.

The boom cylinder 41 rotationally drives (pivots) the boom 31 relative to the upper slewing body 22. A proximal end portion of the boom cylinder 41 is pivotally attached to the upper slewing body 22. The distal end portion of the boom cylinder 41 is pivotally attached to the boom 31.

The arm cylinder 42 rotationally drives the arm 32 relative to the boom 31. The proximal end portion of the arm cylinder 42 is pivotally attached to the boom 31. The distal end portion of the arm cylinder 42 is pivotally attached to the arm 32.

The bucket cylinder 43 rotationally drives the bucket 33 relative to the arm 32. The proximal end portion of the bucket cylinder 43 is pivotally attached to the arm 32. The distal end portion of the bucket cylinder 43 is pivotally attached to a link member pivotally attached to the bucket 33.

Figure 2:
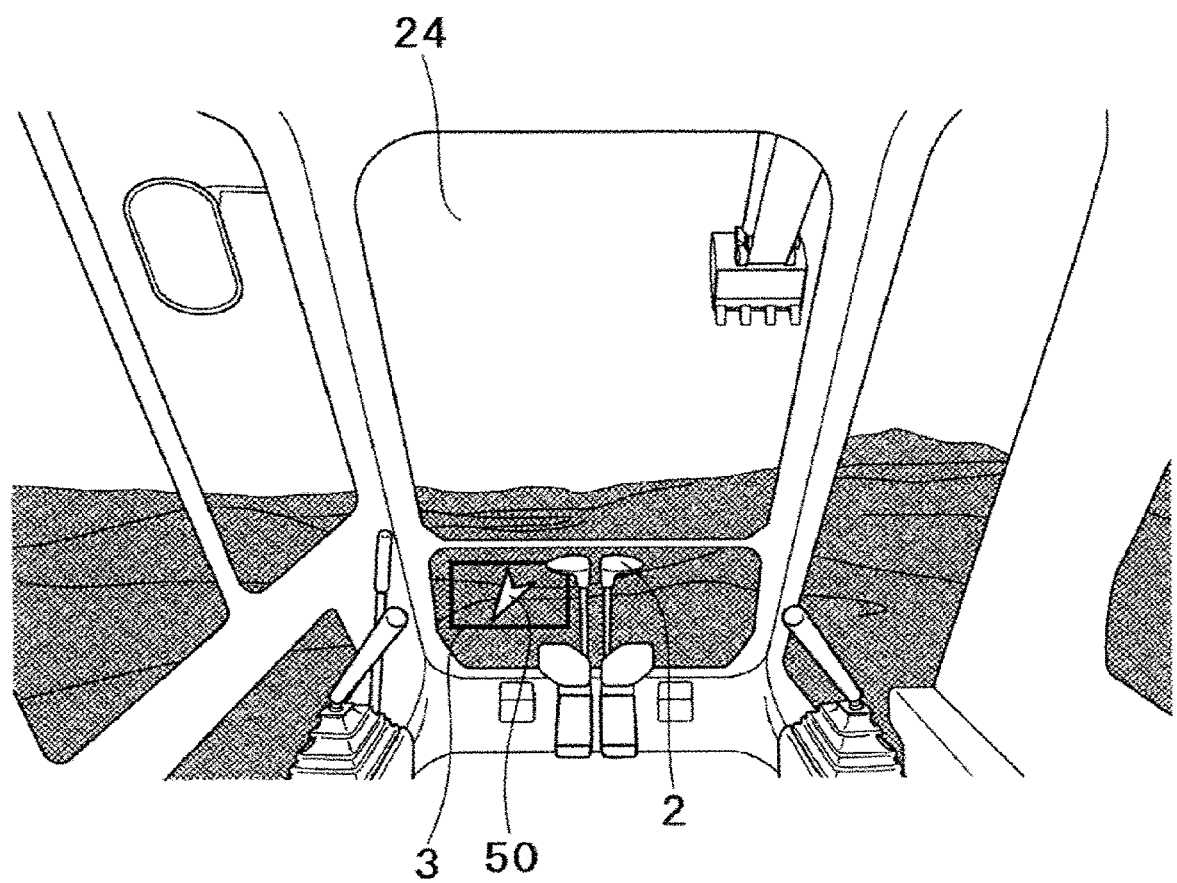
FIG. 2 is a view looking a front sight of an upper slewing body from inside a cab of the construction machine in FIG. 1.

FIG. 2 is a view looking a front sight of the upper slewing body 22 from inside the cab 23 of the construction machine 1 in FIG. 1. As illustrated in FIG. 2, the construction machine 1 includes a travel lever 2. The travel lever 2 is tiltable in front-and-rear direction. An operator manipulates the travel lever 2 to make the lower travelling body 21 travel. That is, the travel lever 2 receives a manipulation by the operator who makes the lower travelling body 21 travel. The travelling direction of the lower travelling body 21 is switched between forward travelling and backward travelling according to the manipulation direction of the travel lever 2. That is, the travel lever 2 can receive a manipulation in a plurality of manipulation directions including a forward manipulating direction to make the lower travelling body 21 travel forward and a backward manipulating direction to make the lower travelling body 21 travel backward. Specifically, the lower travelling body 21 travels forward by the operator tilting the travel lever 2 forward (in the forward manipulating direction), and the lower travelling body 21 travels backward by the operator tilting the travel lever 2 backward (in the backward manipulating direction). The manipulation magnitude of the manipulation received by the travel lever 2 is detected by a manipulation magnitude detecting device 5 which will be described later.

Figure 3:
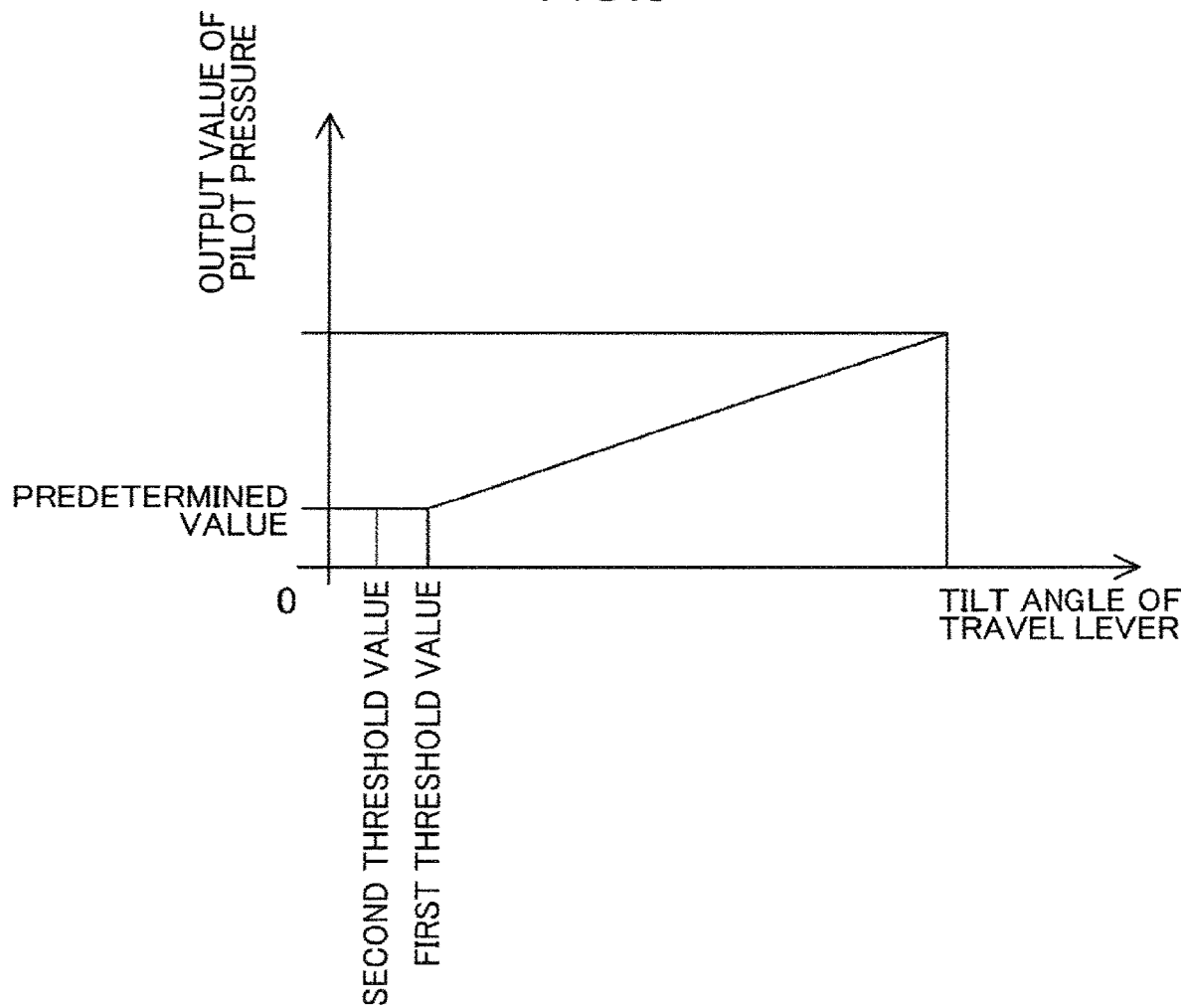
FIG. 3 is a figure illustrating a relationship between a tilt angle (manipulation magnitude) of a travel lever and an output value of pilot pressure of the construction machine according to the first embodiment of the present invention.

FIG. 3 is a figure illustrating a relationship between a tilt angle (manipulation magnitude) of the travel lever 2 and an output value of pilot pressure of the construction machine 1 according to the embodiment. As illustrated in FIG. 3, when the manipulation magnitude received by the travel lever 2 is "0" or higher but smaller than a first threshold value, the output value of the pilot pressure is constant at a predetermined value, and when the manipulation magnitude received by the travel lever 2 is greater than the first threshold value, the output value of the pilot pressure increases above the predetermined value. When the output value of the pilot pressure exceeds the predetermined value, the lower travelling body 21 starts traveling (forward or backward). That is, when the manipulation magnitude received by the travel lever 2 is "0" or greater but smaller than the first threshold value, the lower travelling body 21 stays still. As described above, the manipulation magnitude of the travel lever 2 has a "play".

As illustrated in FIG. 2, the construction machine 1 includes a display device 3. The display device 3 is disposed to be in an eyesight of the operator [3] and displays information. The display device 3 is of a see-through type and disposed in a portion of a front windshield glass (window) 24. The display device 3 includes, for example, a see-through organic EL display. The operator can see a sight outside through the display device 3.

Figure 4:
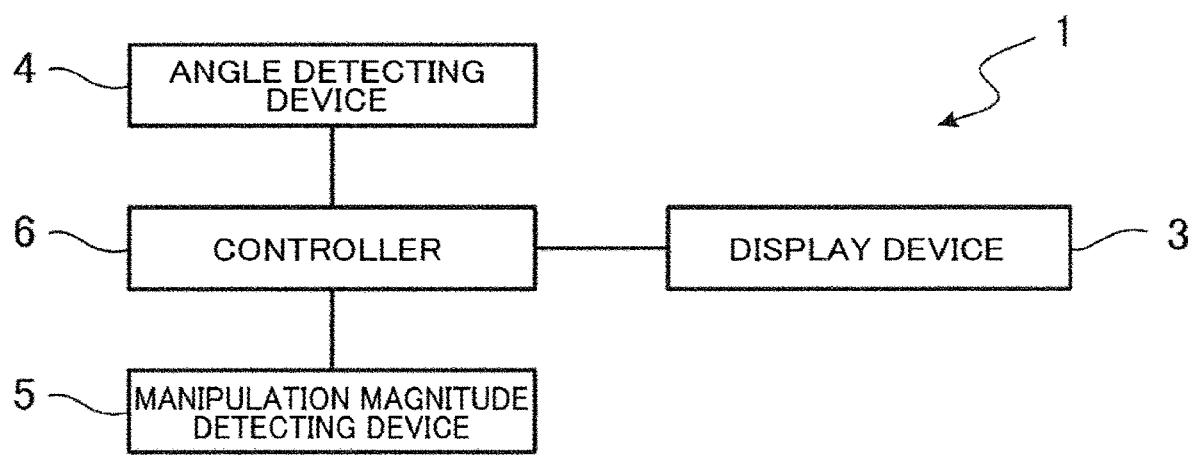
FIG. 4 is a block diagram of the construction machine according to the first embodiment of the present invention.

FIG. 4 is a block diagram of the construction machine 1 according to the embodiment. As illustrated in FIG. 4, the construction machine 1 further includes an angle detecting device 4, a manipulation magnitude detecting device 5, and a controller 6.

The angle detecting device 4 is provided to the machine body 20 and detects a relative angle (slew angle) between the lower travelling body 21 and the upper slewing body 22 about the rotational axis. Although the angle detecting device 4 detects the slew angle of the lower travelling body 21 relative to the upper slewing body 22 in the embodiment, the angle detecting device 4 may detect a slew angle of the upper slewing body 22 relative to the lower travelling body 21.

The manipulation magnitude detecting device 5 detects a manipulation magnitude (tilt angle) of the manipulation received by the travel lever 2 and a manipulation direction of the travel lever 2. Specifically, the manipulation magnitude detecting device 5 detects a tilt angle of the travel lever 2 tilted forward and a tilt angle of the travel lever 2 tilted backward.

The controller (directional information generating unit) 6 calculates (generates) and outputs a travelling direction of the lower travelling body 21 based on the detected result of the angle detecting device 4 and the manipulation direction of the travel lever 2. In particular, the front-and-rear direction (directional information) of the lower travelling body 21 is calculated by the detected result of the angle detecting device 4. From the manipulation direction of the travel lever 2, the direction in which the lower travelling body 21 travels forward or backward is obtained as a travelling direction (directional information). That is, when the manipulation direction of the travel lever 2 is the forward direction, the direction in which the lower travelling body 21 travels forward is obtained as the travelling direction, and when the manipulation direction of the travel lever 2 is the backward direction, the direction in which the lower travelling body 21 travels backward is obtained as the travelling direction. The controller 6 may include a storing unit and compare the detected result of the angle detecting device 4 with information (table) stored in the storing unit to obtain the travelling direction of the lower travelling body 21.

The controller (display controlling unit) 6 makes the display device 3 display an image indicating the calculated travelling direction of the lower travelling body 21 when the travel lever 2 is manipulated. As illustrated in FIG. 2, an arrow image 50 having a shape of an arrow is displayed on the display device 3 in the embodiment. The arrow image 50 is superposed on the sight seen through the front windshield glass 24. The direction indicated by the arrow image 50 changes based on the detected result of the angle detecting device 4 and the manipulation direction of the travel lever 2. For example, when the lower travelling body 21 is stewed to the right side relative to the upper stewing body 22 and travels backward, the arrow image 50 indicates the direction toward the left bottom as illustrated in FIG. 2. The image indicating the travelling direction of the lower travelling body 21 is not limited to the arrow image 50 but may be any image by which the travelling direction of the lower travelling body 21 can be recognized, for example, an icon image of the lower travelling body 21.

In other words, the controller 6 generates and outputs directional information which is related to the travelling direction of the lower travelling body 21 relative to the upper slewing body 22 based on at least the detected result of the angle detecting device 4. Furthermore, when the travel lever 2 is receiving a manipulation by the operator, the controller 6 controls the display device 3 to displays a directional information image (the arrow image 50) indicating the directional information whereas, when the travel lever 2 is not receiving a manipulation, the controller 6 controls the display device 3 not to display the directional information image.

Since the arrow image 50 indicating the travelling direction of the lower travelling body 21 is superposed on the sight seen through the front windshield glass 24 as described above, the operator can check the travelling direction of the lower travelling body 21 while seeing the sight of working without checking the position of the lower travelling body 21 through the front windshield glass 24. Thus, moving the eyesight is less required compared to when the display device 3 is disposed at a place separated from the front windshield glass 24, so that deterioration in work efficiency can be suppressed.

Furthermore, the controller 6 calculates the travelling direction of the lower travelling body 21 based on the detected result of the angle detecting device 4 and the manipulation direction of the travel lever 2 as described above. Thus, the display device 3 can display the arrow image 50 indicating the travelling direction of the lower travelling body 21 when the lower travelling body 21 travels forward or backward, the directions indicated by the arrow image 50 for forward and backward travelling being opposite to each other. In either case of the lower travelling body 21 travelling forward or backward, the operator can correctly recognize the travelling direction of the lower travelling body 21.

In the embodiment, the controller 6 makes the display device 3 display the arrow image 50 when the manipulation magnitude of the travel lever 2 detected by the manipulation magnitude detecting device 5 becomes equal to or greater than a second threshold value (see FIG. 3) which is larger than 0 but smaller than the first threshold value. This enables the display device 3 to display the arrow image 50 indicating the travelling direction of the lower travelling body 21 when the manipulation magnitude of the travel lever 2 is smaller than the first threshold value at which the lower travelling body 21 starts travelling, namely, in a state where the manipulation magnitude is within a "play". This enables the operator to recognize the travelling direction of the lower travelling body 21 in a state where the lower travelling body 21 has not yet started travelling.

Meanwhile, the controller 6 does not let the display device 3 display the arrow image 50 when the travel lever 2 is not manipulated. The arrow image 50 indicating the travelling direction of the lower travelling body 21 is displayed on the display device 3 when a manipulation is given to make the lower travelling body 21 travel (more specifically, the manipulation includes a state where the manipulation magnitude of the travel lever 2 is within a "play"), so that it is not likely that the arrow image 50 causes disturbance during an operation other than travelling. Deterioration in work efficiency can thus be suppressed.

[Operation of Construction Machine]

Figure 5:
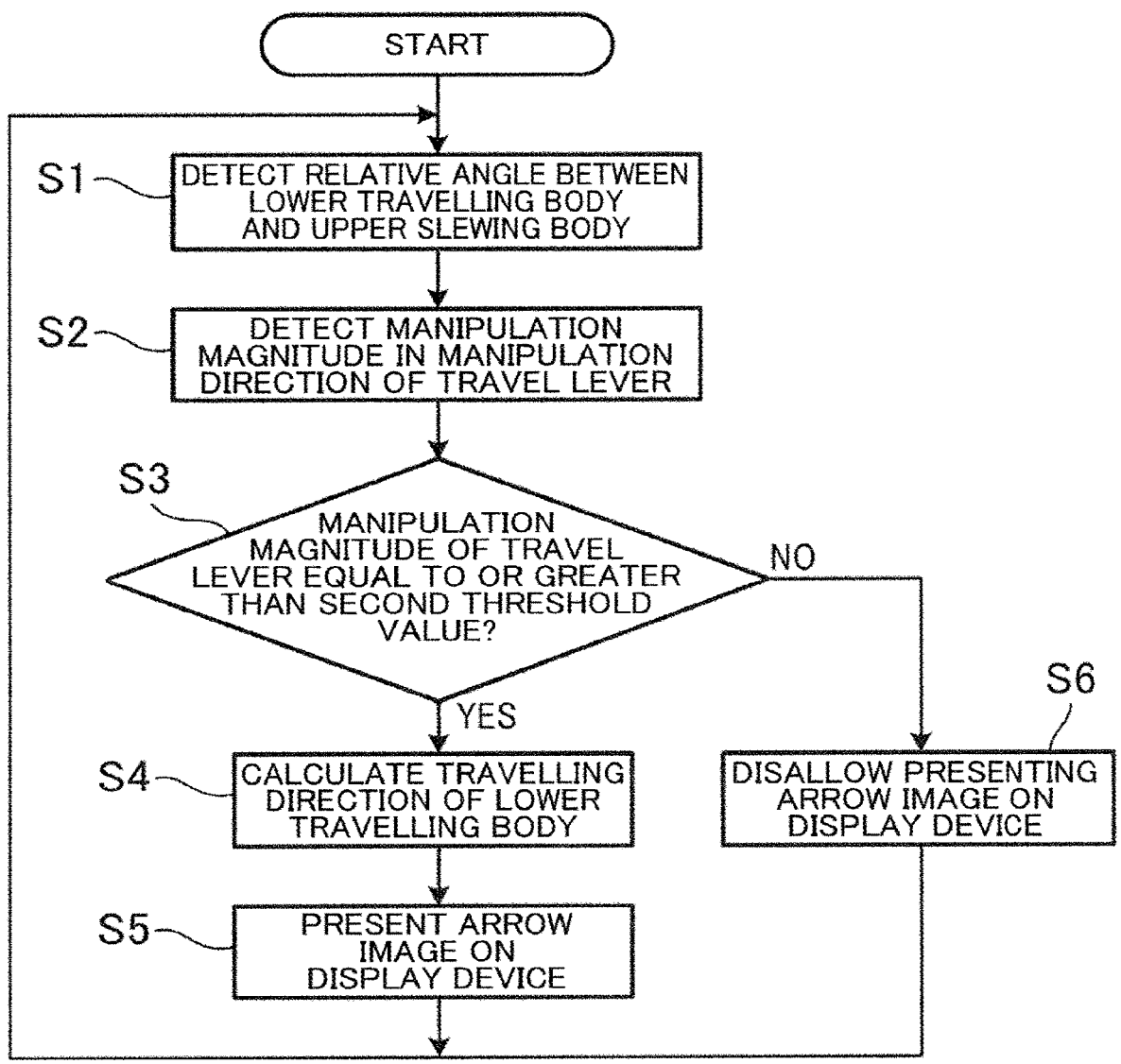
FIG. 5 is a flowchart of a display control of the construction machine according to the first embodiment of the present invention.

FIG. 5 is a flowchart of a display control of the construction machine 1 according to the embodiment. An operation of the construction machine 1 will now be described using FIG. 5.

First, the controller 6 detects the relative angle between the lower travelling body 21 and the upper slewing body 22 from the detected result of the angle detecting device 4 (step S1). Then, the controller 6 detects the manipulation direction and the manipulation magnitude of the travel lever 2 from the detected result of the manipulation magnitude detecting device 5 (step S2).

The controller 6 then determines whether the manipulation magnitude of the travel lever 2 is equal to or greater than the second threshold value (step S3). If it is determined in step S3 that the manipulation magnitude of the travel lever 2 is equal to or greater than the second threshold value (S3: YES), the controller 6 calculates the travelling direction of the lower travelling body 21 based on the detected result of the angle detecting device 4 and the manipulation direction of the travel lever 2 (step S4). The controller 6 makes the display device 3 display the arrow image 50 (step S5). The step returns to step S1.

Meanwhile, if it is determined in step S3 that the manipulation magnitude of the travel lever 2 is not equal to or not greater than the second threshold value (S3: NO), the controller 6 does not let the display device 3 display the arrow image 50 (step S6). The step returns to step S1.

[Effect]

In the construction machine 1 according to the embodiment as described above, the arrow image 50 indicating the travelling direction of the lower travelling body 21 is displayed on the display device 3 when the travel lever 2 is manipulated while the arrow image 50 indicating the travelling direction of the lower travelling body 21 is not displayed on the display device 3 when the travel lever 2 is not manipulated. Since the arrow image 50 indicating the travelling direction of the lower travelling body 21 is displayed on the display device 3 when a manipulation is given to make the lower travelling body 21 travel, it is not likely that the arrow image 50 causes disturbance during an operation other than travelling. Deterioration in work efficiency can thus be suppressed. In particular, when the operator manipulates the travel lever 2 while manipulating a slew lever or an attachment manipulating lever disposed in the cab 23 like the travel lever 2, the operator can check the travelling direction of the lower travelling body 21 by the arrow image 50. Meanwhile, when the operator does not manipulate the travel lever 2 while manipulating the slew lever or the attachment manipulating lever, the arrow image 50 is not displayed and the operator can concentrate on slewing or manipulating the attachment.

Furthermore, the travelling direction of the lower travelling body 21 is obtained based on the detected result of the angle detecting device 4 and the manipulation direction of the travel lever 2. The arrow image 50 indicating the travelling direction of the lower travelling body 21 is displayed on the display device 3. The display device 3 can display the arrow image 50 indicating the travelling direction of the lower travelling body 21 when the lower travelling body 21 travels forward or backward, the directions indicated by the arrow image 50 for forward and backward travelling being opposite to each other. In either case of the lower travelling body 21 travelling forward or backward, the operator can correctly recognize the travelling direction of the lower travelling body 21.

When the manipulation magnitude of the travel lever 2 detected by the manipulation magnitude detecting device 5 becomes equal to or greater than the second threshold value, the controller 6 makes the display device 3 display the arrow image 50 indicating the travelling direction of the lower travelling body 21. The second threshold value is larger than 0 but smaller than the first threshold value. This enables the display device 3 to display the arrow image 50 indicating the travelling direction of the lower travelling body 21 when the manipulation magnitude of the travel lever 2 is smaller than the first threshold value at which the lower travelling body 21 starts travelling, namely, in a state where the manipulation magnitude is within a "play". This enables the operator to recognize the travelling direction of the lower travelling body 21 in a state where the lower travelling body 21 has not yet started travelling (state before starting travelling).

A see-through display device 3 is disposed on the front windshield glass 24 of the cab 23. Since the arrow image 50 indicating the travelling direction of the lower travelling body 21 is superposed on the sight seen through the front windshield glass 24, the operator can check the travelling direction of the lower travelling body 21 while seeing the sight of working without checking the position of the lower travelling body 21 through the front windshield glass 24. Thus, moving the eyesight is less required compared to when the display device 3 is disposed at a place separated from the front windshield glass 24, so that deterioration in work efficiency can be suppressed.

Second Embodiment

Figure 6:
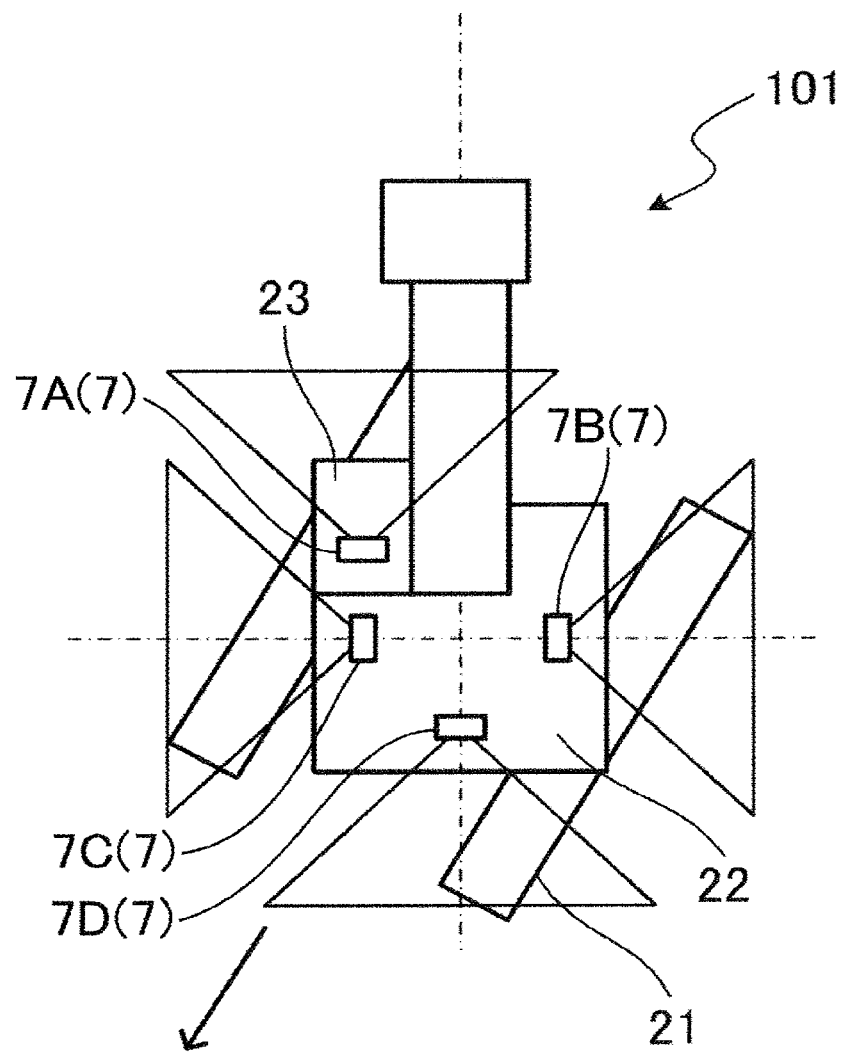
FIG. 6 is a top view of the construction machine according to a second embodiment of the present invention.
Figure 7:
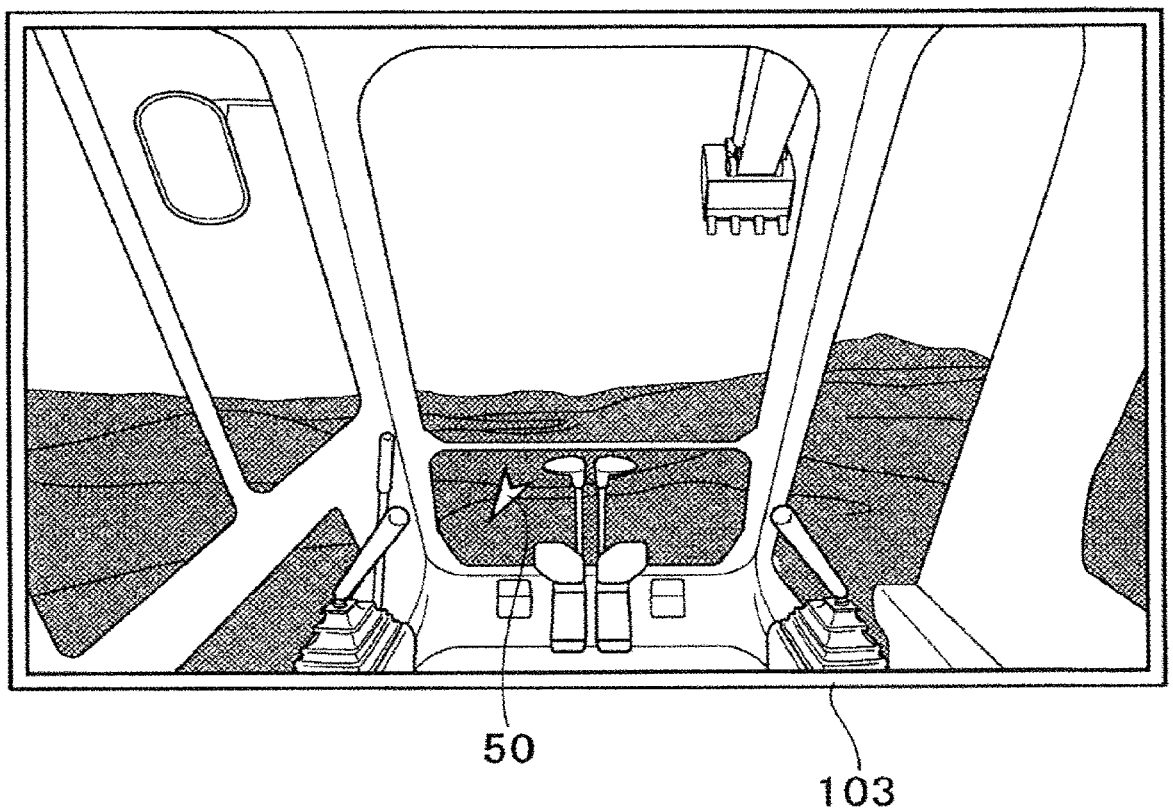
FIG. 7 is a view illustrating a screen of a display device according to the second embodiment of the present invention.
Figure 8:
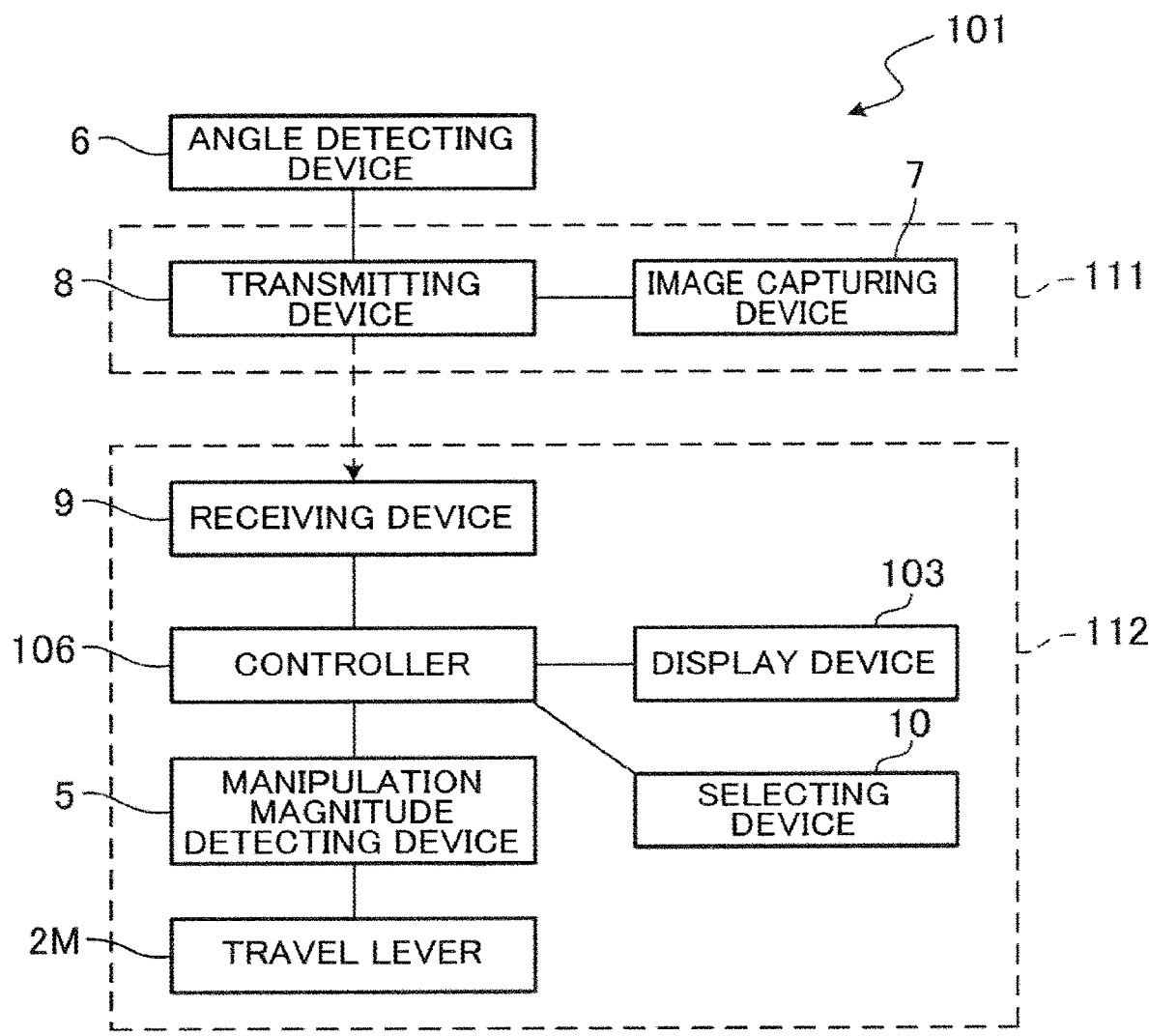
FIG. 8 is a block diagram of the construction machine according to the second embodiment of the present invention.

A construction machine according to a second embodiment will be described with reference to the drawings. FIG. 6 is a top view of a construction machine 101 according to the embodiment. FIG. 7 is a view illustrating a screen of a display device 103 according to the embodiment. FIG. 8 is a block diagram of the construction machine 101 according to the embodiment. In the embodiment, description on the configuration common to the first embodiment and the effect obtained by the configuration are omitted. A feature different from the first embodiment will mainly be described. In the description below and in FIGS. 6 to 8, the member same as that in the first embodiment will be appended with the same reference sign.

[Configuration of Construction Machine]

In the construction machine 1 according to the first embodiment, the operator in the cab 23 operates the machine body 20. In contrast, in the construction machine 101 according to the embodiment, an operator outside the construction machine 101 remotely operates the machine body 20.

The construction machine 101 according to the embodiment includes a slave device 111 provided to the machine body 20, and a master device 112 for remotely operating the slave device 111. The master device 112 is provided in an operating region which is disposed at a place remote from the machine body 20, and is electrically connected by wire or wirelessly to the slave device 111. The operating region may be a remote control unit disposed at a location from which the construction machine 101 can be seen or a control center disposed at a place remote from the construction machine 101.

As illustrated in FIG. 6, the slave device 111 (FIG. 8) includes a plurality of image capturing devices 7 (at least one image capturing device). A plurality of the image capturing devices 7 are provided on the upper slewing body 22 to be oriented to predetermined image capturing directions to capture sights seen from the upper slewing body 22. A plurality of the image capturing devices 7 are positioned to be oriented to different image capturing directions. In the embodiment, a plurality of the image capturing devices 7 are provided in the cab 23 and include an image capturing device 7A that captures an image of a front sight of the upper slewing body 22 through the front windshield glass 24, an image capturing device 7B that captures an image of a right sight of the upper slewing body 22, an image capturing device 7C that captures an image of a left sight of the upper slewing body 22, and an image capturing device 7D that captures an image of a rear sight of the upper slewing body 22. An arrow pointing the left bottom in FIG. 6 is a direction in which the lower travelling body 21 which is stewed relative to the upper slewing body 22 travels backward. A triangle extending from each of the image capturing devices 7 schematically indicates an angle of view (a view angle) of the image capturing device 7.

The master device 112 includes a travel lever 2M, and the display device 103 (FIG. The travel lever 2M is similar to the travel lever 2 of the first embodiment disposed in the cab 23. The manipulation magnitude of the travel lever 2M is detected by a manipulation magnitude detecting device 5. The display device 103 is disposed in a place remote from the machine body 20 (remote place) so as to be seen by the operator. For example, the display device 103 is a liquid crystal display disposed in a room in the remote place.

As illustrated in FIG. 7, a sight image captured by the image capturing device 7 provided to the machine body 20 is displayed on the display device 103. In FIG. 7, a sight image captured by the image capturing device 7A, which captures a front sight of the upper slewing body 22, is displayed on the display device 103, as an example.

As illustrated in FIG. 8, the slave device 111 includes a transmitting device 8. The transmitting device 8 transmits sight images captured by the image capturing devices 7 (7A to 7D) and the detected result of an angle detecting device 6 to the master device 112.

The master device 112 includes a receiving device 9, the manipulation magnitude detecting device 5, and a controller 106. The receiving device 9 receives the sight images transmitted by the transmitting device 8 and the detected result of the angle detecting device 64. The controller (display controlling unit) 106 makes the display device 103 display the sight images captured by the image capturing device 7.

The master device 112 includes a selecting device 10. The selecting device 10 selects one among a plurality of the image capturing devices 7 in response to a manipulation made by the operator. The controller 106 makes the display device 103 display the sight image captured by the image capturing device 7 selected by the selecting device 10. For example, when the image capturing device 7 that captures an image of a rear sight of the upper slewing body 22 is selected, a sight image of the rear sight of the upper stewing body 22 captured by the image capturing device 7 is displayed on the display device 103.

Like in the first embodiment, the controller (directional information generating unit) 106 calculates a travelling direction of the lower travelling body 21 based on the detected result of the angle detecting device 6 and the manipulation direction of the travel lever 2M. The controller 106 calculates (generates) the travelling direction (directional information) of the lower travelling body 21 based on the image capturing direction of the image capturing device 7 selected by the selecting device 10 and the detected result of the angle detecting device 64 and outputs the information.

As illustrated in FIG. 7, when the travel lever 2M is manipulated, the controller (display controlling unit) 106 makes the display device 103 superpose the arrow image 50 on the sight image displayed by the display device 103. This enables the operator to check the travelling direction of the lower travelling body 21 while seeing the sight image. The operator is less required to move the eyesight, and thus deterioration of work efficiency can be suppressed. The direction indicated by the arrow image 50 in FIG. 7 is the backward travelling direction of the lower travelling body 21 indicated by an arrow in FIG. 6.

The controller 106 superposes the arrow image 50 on the sight image captured by the image capturing device 7 selected by the selecting device 10. When another image capturing device 7 is selected, the image capturing direction is switched and the arrow image 50 corresponding to the image capturing direction of the selected image capturing device 7 is superposed on the sight image. This enables the operator to correctly recognize the travelling direction of the lower travelling body 21 when a sight image captured by any one of the image capturing devices 7 is displayed on the display device 103.

Like in the first embodiment, when the manipulation magnitude of the travel lever 2M is smaller than the second threshold value, the arrow image 50 indicating the travelling direction of the lower travelling body 21 is not displayed on the display device 103, and when the manipulation magnitude of the travel lever 2M becomes equal to or greater than the second threshold value, the arrow image 50 indicating the travelling direction of the lower travelling body 21 is displayed on the display device 103.

That is, in the embodiment, the travel lever 2M, the display device 103, the receiving device 9, the selecting device 10, and the controller 106 (directional information generating unit and display controlling unit) are provided in the operating region placed outside the machine body 20.

[Effect]

In the construction machine 101 according to the embodiment as described above, the arrow image 50 indicating the travelling direction of the lower travelling body 21 is superposed on the sight image displayed on the display device 103. The operator can check the travelling direction of the lower travelling body 21 while seeing the sight image. The operator is less required to move the eyesight, and thus deterioration of work efficiency can be suppressed.

The travelling direction of the lower travelling body 21 is calculated (obtained) based on the image capturing direction of the image capturing device 7 selected by the selecting device 10 and the detected result of the angle detecting device 64. The arrow image 50 indicating the travelling direction of the lower travelling body 21 is superposed on the sight image captured by the image capturing device 7 selected by the selecting device 10. When another image capturing device 7 is selected, the arrow image 50 corresponding to the image capturing direction of the image capturing device 7 is superposed on the sight image. This enables the operator to correctly recognize the travelling direction of the lower travelling body 21 when a sight image captured by any one of the image capturing devices 7 is displayed on the display device 103.

Each of the embodiments of the present invention described above is merely a specific example and does not limit the scope of the present invention. Specific configurations can suitably be redesigned. The described effect of the embodiment of the present invention is the most preferable effect that can be obtained by the present invention. The effect of the present invention is not limited to that of the described embodiments of the present invention.

For example, in the first embodiment and the second embodiment, the display device 3 displays the arrow image 50 indicating the travelling direction of the lower travelling body 21 when the travel lever 2 (2M) is tilted forward (when the lower travelling body 21 travels forward) and when the travel lever 2 is tilted backward (when the lower travelling body 21 travels backward), the directions indicated by the arrow image 50 for forward and backward travelling being opposite to each other. However, the display device 3 may always display the arrow image 50 indicating the direction in which the lower travelling body 21 travels forward as the travelling direction no matter which manipulation direction the travel lever 2 is manipulated.

The present invention provides a construction machine including a machine body including a lower travelling body that can travel on a ground, and an upper slewing body that is provided on an upper portion of the lower travelling body and can slew about a rotational axis extending in an up-and-down direction, an angle detecting device provided to the machine body to detect a relative angle between the lower travelling body and the upper slewing body about the rotational axis, a travel lever that receives a manipulation for making the lower travelling body travel, a display device disposed within an eyesight of the worker, a directional information generating unit that generates directional information related to a travelling direction of the lower travelling body relative to the upper slewing body based on at least a detected result of the angle detecting device, and a display controlling unit that controls the display device to display a directional information image indicating the directional information on the display device when the travel lever receives the manipulation, and not to display the directional information image on the display device when the travel lever does not receive the manipulation.

It is preferable, in the above configuration, that the travel lever is able to receive the manipulation in a plurality of manipulation directions including a forward manipulating direction for making the lower travelling body travel forward and a backward manipulating direction for making the lower travelling body travel backward, and the directional information generating unit generates the directional information based on the detected result of the angle detecting device and the manipulation direction of the manipulation received by the travel lever.

It is preferable, in the above configuration, that the lower travelling body starts travelling when a manipulation magnitude of the manipulation received by the travel lever exceeds a first threshold value, a manipulation magnitude detecting device that detects the manipulation magnitude received by the travel lever is further included, and the display controlling unit makes the display device display the directional information image when the manipulation magnitude of the travel lever detected by the manipulation magnitude detecting device is greater than 0 and equal to or greater than a second threshold value smaller than the first threshold value.

It is preferable, in the above configuration, that the upper slewing body includes an operation room including a window and allowing the worker to get inside, and the display device includes a see-through display disposed in a portion of the window.

It is preferable, in the above configuration, that the travel lever, the display device, the directional information generating unit, and the display controlling unit are provided in an operating region placed outside the machine body, at least one image capturing device that is provided to the upper slewing body to be oriented to a predetermined image capturing direction and captures an image of a sight seen from the upper slewing body, a transmitting device that is provided to the machine body and transmits a sight image captured by the at least one image capturing device and the detected result of the angle detecting device to the operating region, and a receiving device that is provided in the operating region and receives the sight image transmitted from the transmitting device and the detected result of the angle detecting device are further included, and the display controlling unit makes the display device display the sight image and superpose the directional information image on the sight image.

It is preferable, in the above configuration, that the at least one image capturing device includes a plurality of image capturing devices set to different image capturing directions, a selecting device that is provided in the operating region and selects one among the plurality of image capturing devices is further included, the directional information generating unit generates the directional information based on the image capturing direction of the one among the image capturing devices selected by the selecting device and the detected result of the angle detecting device, and the display controlling unit makes the display device display the sight image captured by the one among the image capturing devices and superpose the directional information image captured by the one among the image capturing devices on the sight image.

The invention claimed is:

1. A construction machine comprising:
 a machine body including a lower travelling body that can travel on a ground, and an upper slewing body that is provided on an upper portion of the lower travelling body and can slew about a rotational axis extending in an up-and-down direction;
 an angle detector provided to the machine body to detect a relative angle between the lower travelling body and the upper slewing body about the rotational axis;
 a travel lever that receives a manipulation for making the lower travelling body travel;
 a display disposed within an eyesight of a worker;
 a directional information generator that generates directional information related to a travelling direction of the lower travelling body relative to the upper slewing body based on at least a detected result of the angle detector; and
 a display controller that controls the display to display a directional information image indicating the directional information on the display when the travel lever receives the manipulation, and not to display the directional information image on the display when the travel lever does not receive the manipulation,
 wherein:
 the lower travelling body starts travelling when a manipulation magnitude of the manipulation received by the travel lever exceeds a first threshold value which is greater than zero,
 the construction machine further comprises a manipulation magnitude detector that detects the manipulation magnitude received by the travel lever, and
 the display controller makes the display the directional information image when the manipulation magnitude of the travel lever detected by the manipulation magnitude detector is equal to or greater than a second threshold value greater than zero and smaller than the first threshold value,
 the travel lever, the display, the directional information generator, and the display controller are provided in an operating region placed outside the machine body,
 the construction machine further comprises at least one image capturing device that is provided to the upper slewing body to be oriented to a predetermined image capturing direction and captures an image of a sight seen from the upper slewing body, a transmitter that is provided to the machine body and transmits a sight image captured by the at least one image capturing device and the detected result of the angle detector to the operating region, and a receiving device that is provided in the operating region and receives the sight image and the detected result of the angle detector transmitted from the transmitter, and
 the display controller makes the display the sight image, and makes the display superpose the directional information image on the sight image when the manipulation magnitude of the travel lever becomes equal to or greater than the second threshold value, but not superpose the directional information image on the sight image when the manipulation magnitude of the travel lever is smaller than the second threshold value.

2. The construction machine according to claim 1, wherein
 the travel lever is able to receive the manipulation in a plurality of manipulation directions including a forward manipulating direction for making the lower travelling body travel forward and a backward manipulating direction for making the lower travelling body travel backward, and
 the directional information generator generates the directional information based on the detected result of the angle detector and the manipulation direction of the manipulation received by the travel lever.

3. The construction machine according to claim 1, wherein
 the upper slewing body includes an operation room including a window and allowing the worker to get inside, and
 the display comprises a see-through display disposed in a portion of the window.

4. The construction machine according to claim 1, wherein
 the at least one image capturing device includes a plurality of image capturing devices set to different image capturing directions,
 the construction machine further comprises a selecting device that is provided in the operating region and selects one among the plurality of image capturing devices,
 the directional information generator generates the directional information based on the image capturing direction of the one among the image capturing devices selected by the selecting device and the detected result of the angle detector, and
 the display controller makes the display the sight image captured by the one among the image capturing devices, and makes the display superpose the directional information image on the sight image when the manipulation magnitude of the travel lever becomes equal to or greater than the second threshold value, but not superpose the directional information image on the sight image when the manipulation magnitude of the travel lever is smaller than the second threshold value.

* * * * *